United States Patent [19]

Spearin et al.

[11] Patent Number: 5,616,367
[45] Date of Patent: Apr. 1, 1997

[54] IN-LINE APPLICATION OF SOLID LUBRICANT TO STEEL STRIP

[75] Inventors: Elliott Y. Spearin, Crown Point, Ind.; James C. Carney, Middletown, Ohio

[73] Assignee: Inland Steel Company, Chicago, Ill.

[21] Appl. No.: 559,729

[22] Filed: Nov. 15, 1995

Related U.S. Application Data

[63] Continuation of Ser. No. 234,541, Apr. 28, 1994, abandoned.

[51] Int. Cl.$^6$ .................. B05D 3/00; B05D 1/00
[52] U.S. Cl. .......... 427/532; 427/542; 427/557; 427/177; 427/178; 427/327; 427/329; 427/388.1; 427/388.4; 427/388.5; 427/398.2; 427/398.3; 427/398.4; 427/420; 427/428; 427/424; 427/433
[58] Field of Search ............... 427/532, 542, 427/557, 177, 178, 327, 329, 388.1, 388.4, 388.5, 398.2, 398.3, 398.4, 420, 424, 428, 433

[56] References Cited

U.S. PATENT DOCUMENTS

| | | | |
|---|---|---|---|
| 4,032,678 | 6/1977 | Perfetti et al. | 427/388 |
| 4,191,801 | 3/1980 | Jahnke | 428/467 |
| 4,321,308 | 3/1982 | Jahnke | 428/469 |
| 4,753,743 | 6/1988 | Sech | 252/33.4 |
| 4,812,365 | 3/1989 | Saunders et al. | 428/469 |
| 4,999,241 | 3/1991 | Coduti et al. | 428/340 |
| 5,151,297 | 9/1992 | Robbins et al. | 427/46 |
| 5,248,528 | 9/1993 | Robbins et al. | 427/522 |
| 5,391,396 | 2/1995 | Morrand | 427/329 |

FOREIGN PATENT DOCUMENTS

| | | |
|---|---|---|
| 0043182A1 | 1/1982 | European Pat. Off. |
| 2629103 | 9/1989 | France |
| 2097802 | 11/1982 | United Kingdom |

OTHER PUBLICATIONS

McManus, George, "Putting Sheet Right On The Presses," *Iron Age*, Apr., 1987, pp. 37–39.

Coduti, "The Production and Implementation of Prelubricated Cold Rolled Steel©," *Lubrication Engineering*, Sep., 1986, pp. 532–538.

*Primary Examiner*—Katherine Bareford
*Attorney, Agent, or Firm*—Marshall, O'Toole, Gerstein, Murray & Borun

[57] ABSTRACT

A solid lubricant application procedure is combined in-line with a steel strip processing method which comprises processing steps upstream and downstream of the lubricant application procedure. The latter comprises applying the lubricant material in molten form or as a solution and may include temperature adjusting steps both upstream and downstream of the lubricant material-applying step. The space for incorporating the lubricant application procedure into the steel strip processing line is limited. The strip speed in the lubricant application procedure is synchronized with the strip speed normally attained in the steel strip processing method in the absence of an in-line lubricant application procedure. The steps of the lubricant application procedure are constrained to accommodate the space limits and strip speed synchronization requirement imposed on the lubricant application procedure when it is combined in-line with the steel strip processing method.

41 Claims, 1 Drawing Sheet

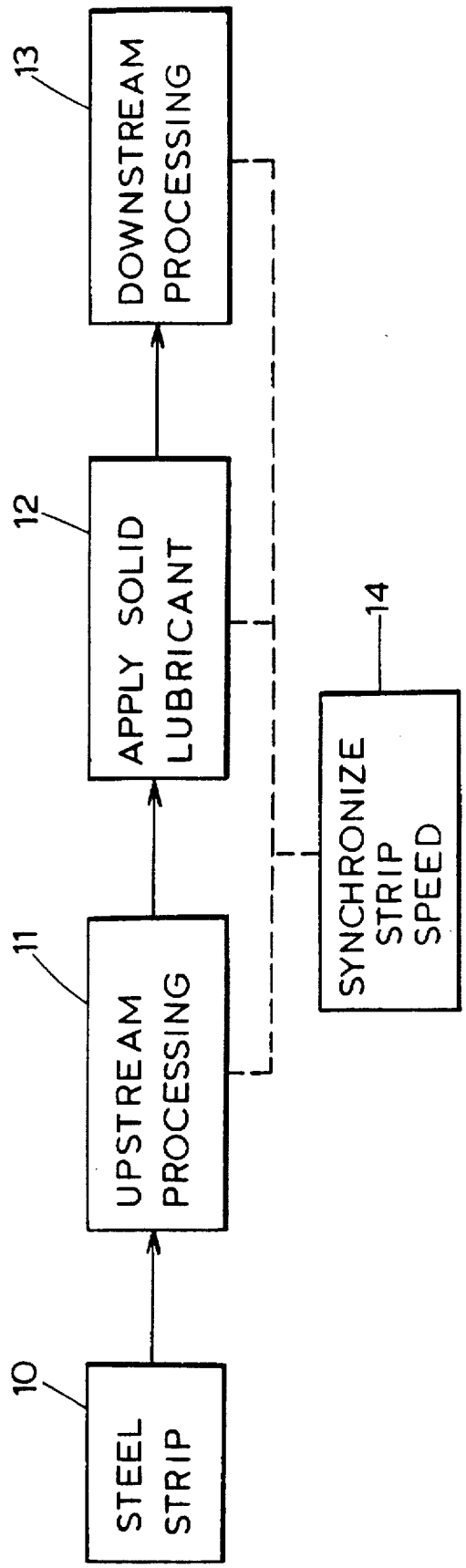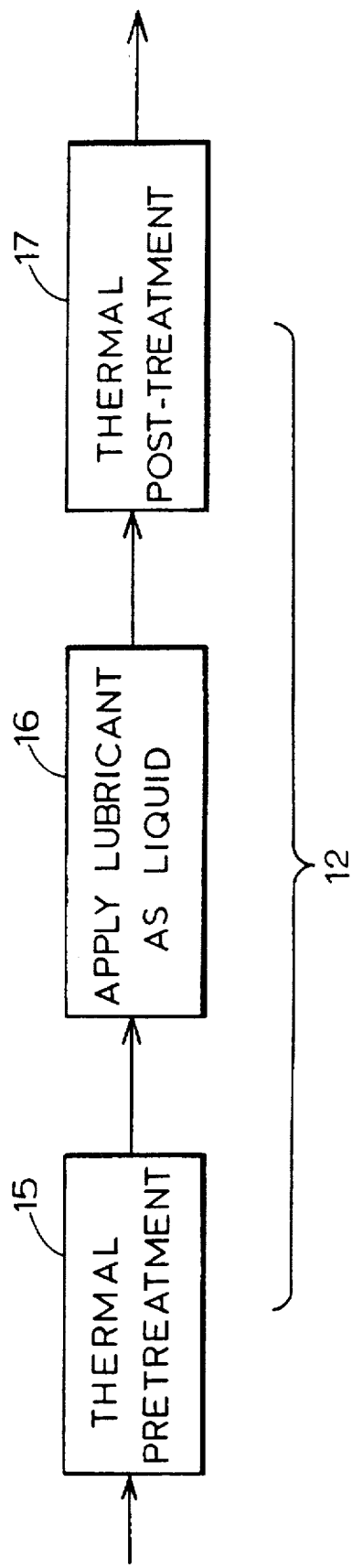

IN-LINE APPLICATION OF SOLID LUBRICANT TO STEEL STRIP

This is a continuation of U.S. application Ser. No. 08/234,541, filed Apr. 28, 1994, now abandoned.

BACKGROUND OF THE INVENTION

The present invention relates generally to the application of a solid lubricant on steel strip and more particularly to the combination of a lubricant application procedure in-line with a method for processing steel strip.

When a steel strip is subjected to a fabricating operation, such as stamping or drawing, it is desirable for the steel strip to have a film of lubricant thereon, as that facilitates the fabricating operation. Generally, the lubricant film can be either solid or liquid, but solid lubricant films have advantages over liquid films, and solid lubricant films are preferred.

When a solid lubricant is applied to steel strip, the lubricant is applied in the form of a liquid, either in molten form or as a solution. The solid lubricant application procedure can be in-line or external. In-line application refers to application during processing of the steel strip in the steel mill, as distinguished from external application in which the solid lubricant is applied at an external processing line separate and apart from a steel mill processing line. External application requires transportation and handling (and the equipment and manpower associated therewith) over and above that employed with in-line processing, thereby substantially increasing the time, effort and money involved.

There are certain problems which must be overcome should one attempt to retrofit existing steel mill strip processing lines to incorporate in-line application of solid lubricant. One cannot merely incorporate a conventional external application procedure into an existing steel mill processing line. This is because a conventional external application line can occupy a relatively large amount of space which is not available in existing steel mill strip processing lines. Moreover, in existing steel mill strip processing lines, the steel strip moves along the processing line at a relatively rapid speed, and in-line solid lubricant application equipment desirably should be synchronized to operate at the same speed. A solid lubricant application procedure not only incorporates the step of applying the solid lubricant to the surface of the steel strip, but also it generally incorporates a thermal treatment step for the steel strip either upstream or downstream of the solid lubricant-applying step, or both. In-line application of solid lubricant requires incorporating all of these processing steps (and the equipment for performing them) into the steel mill strip processing line, while (1) accommodating those steps and equipment to the space limitations in the steel mill strip processing line, (2) synchronizing the speed of the lubricant application procedure to the relatively rapid speed at which the steel mill strip processing line is operated and (3) allowing enough flexibility in the design of the solid lubricant application equipment to accommodate both hot melt and solution-based solid film lubricants.

Examples of solid lubricants for steel strip and of procedures for applying the solid lubricant are described in Coduti, et al., U.S. Pat. No. 4,999,241 (wax type solid lubricant), Robbins, et al., U.S. Pat. No. 5,151,297 (acrylic polymer solid lubricant) and Sech U.S. Pat. No. 4,753,743 (wax type solid lubricant); the disclosures in all of these U.S. patents are incorporated herein by reference.

The Coduti, et al. patent teaches preheating a steel strip to which a wax lubricant is to be applied in molten form; the strip preheat temperature is 5° to 10° F. above the melting point of the wax. (The melting point for wax lubricants is typically in the range 120°–150° F. (49°–66° C.)). The higher the strip preheat temperature, the more difficult it is to accommodate the strip preheating step (and any subsequent cooling step) (a) to the space limitations in the steel strip processing line and (b) to the strip speed synchronizing requirement, imposed upon the lubricant application procedure when one attempts to combine that procedure in-line with a method for processing steel strip in an existing strip processing line.

SUMMARY OF THE INVENTION

The present invention combines a solid lubricant application procedure with a steel mill strip processing line. The handling, transportation and other drawbacks and disadvantages of an external solid lubricant application line are eliminated, and the problems associated with the space limitations and strip speed synchronization requirement of the steel mill processing line are overcome.

The steel mill processing line performs a multi-step method for processing a continuous steel strip and comprises performing at least one processing step upstream of the solid lubricant application procedure and another processing step downstream of the solid lubricant application procedure. The steel strip is moved in a downstream direction during these processing steps, and the speed of the moving steel strip in the downstream processing step is synchronized with the strip speed in the upstream processing step. This is a relatively rapid speed, typically in excess of 200 ft./min. (61 m/min.), for example, and depending upon the particular steel strip processing method one employs, the strip speed can be as high as 5,000 ft./min. (1524 m/min.).

The solid lubricant application procedure is performed in-line with the strip processing method and applies, to the steel strip, a material which forms a transparent film of solid lubricant on the steel strip. The lubricant application procedure comprises applying the film-forming material to the moving steel strip, adjusting the temperature of the moving steel strip before the material is applied, or after the material is applied, or both. The speed of the moving steel strip is synchronized during the lubricant application procedure with the strip speed employed in the strip-processing steps described above.

Because of space limitations in the steel mill processing line and because the speed of the strip during the lubricant application procedure is synchronized with the relatively rapid speed of the moving steel strip in the steel mill strip-processing steps, there is a limit on the time available for performing the material-applying and temperature-adjusting steps of the lubricant application procedure. In accordance with the present invention, the performance of the material-applying and temperature-adjusting steps are constrained to accommodate to the time limitations imposed by the space limitations and the synchronizing step.

The solid lubricant employed in the lubricant application procedure can be either a wax-type of lubricant or an acrylic polymer type of lubricant, for example. The steel mill processing steps are essentially conventional and can include, in addition to uncoiling and coiling steps, a temper rolling step, an inspection step, and hot dip or electrolytic metallic coating steps. In cases where the coating is zinc, the steel mill processing line can include a subsequent galvannealing step.

As noted above, the lubricant application procedure can include a temperature adjusting step upstream and/or downstream of the material-applying step. The type of temperature-adjusting step and its use is dependent upon (a) the type of solid lubricant employed, (b) the manner in which the lubricant material is applied, and (c) which of the various steel strip-processing steps one employs in the steel mill strip-processing method. The upstream temperature-adjusting step, when employed, is generally a heating step. The downstream temperature-adjusting step can be a heating step or a cooling step. All of the heating and cooling steps are performed sufficiently rapidly to accommodate to the time limitations imposed by incorporating the lubricant application procedure in line with the steel strip processing method. These temperature-adjusting steps will be discussed more fully below in the Detailed Description.

Preferably the in-line solid lubricant application procedure incorporates provision for performing both upstream and downstream temperature-adjusting steps. This enables one to employ, as alternatives, either a wax-type solid lubricant or a polymer-type solid lubricant, in the same processing line.

The employment of an in-line lubricant application procedure in accordance with the present invention does not require any change in the steel strip processing method, either upstream or downstream of the location where the solid lubricant is applied. Moreover, the strip speed in the lubricant application procedure can be synchronized with the strip speed in the steel strip processing method without substantially diminishing the strip speed normally attained in that method in the absence of an inline lubricant application procedure.

Other features and advantages are inherent in the invention claimed and disclosed or will become apparent to those skilled in the art from the following detailed description in conjunction with the accompanying diagrammatic drawings. Advantages resulting from a combination in accordance with the present invention are applicable to both (a) an existing steel mill strip processing line and (b) a new steel mill strip processing line.

BRIEF DESCRIPTION OF THE DRAWING

FIG. 1 is a block diagram illustrating the combination of a steel strip processing method and an in-line solid lubricant application procedure, all in accordance with an embodiment of the present invention; and FIG. 2 is a block diagram illustrating an in-line lubricant application procedure in accordance with the present invention.

DETAILED DESCRIPTION

Referring initially to FIG. 1, there is illustrated a combination in accordance with the present invention. The combination comprises (a) a multi-step method 11, 13 for processing a continuous steel strip 10 and (b) a solid lubricant application procedure 12 in line with the strip-processing method, for applying, to steel strip 10, a material which forms a transparent film of solid lubricant on the steel strip. The strip-processing method comprises performing at least one processing step 11 upstream of lubricant application procedure 12 and performing at least one processing step 13 downstream of the lubricant application procedure. Steel strip 10 moves in a downstream direction during processing steps 11 and 13. The speed of the moving steel strip in downstream processing step 13 is synchronized at 14 with the strip speed employed in upstream processing step 11.

Lubricant application procedure 12 comprises three basic parts, illustrated in FIG. 2. These include a thermal pre-treatment part 15 performed upstream of a part 16 at which the lubricant material is applied as a liquid, and part 16 is in turn performed upstream of a thermal post-treatment part 17. The thermal pre-treatment at 15 typically may comprise sensing the temperature of the moving steel strip before the lubricant material is applied at 16 and adjusting the temperature of the moving steel strip in response to the temperature sensing step. The thermal post-treatment at 17 typically may comprise sensing the temperature of the moving steel strip after the lubricant material is applied at 16 and adjusting the temperature of the moving steel strip in response to that temperature sensing step. In a steel mill processing line performing steps 11 and 13, there is a limit on the amount of space available for incorporating the three parts 15–17 of lubricant application procedure 12 in-line.

Referring again to FIG. 1, the speed of the moving steel strip 10 during the lubricant application procedure 12 is synchronized at 14 with the strip speed employed in strip-processing steps 11 and 13. As a result of (a) the synchronizing step described in the preceding sentence and (b) the space limitations in the processing line incorporating steps 11 and 13, there is a limit on the time available for performing steps 15–17 of lubricant application procedure 12. Accordingly, the performance of steps 15–17 is constrained to accommodate to the time limit imposed by the space limitations and the synchronizing step.

The solid lubricant applied to the steel strip can be a wax-type lubricant, examples of which are disclosed in the aforementioned Coduti, et al. and Sech U.S. patents. Alternatively, the solid lubricant can be a polymer type, examples of which are disclosed in the aforementioned Robbins, et al. U.S. patent. The following discussion will initially discuss the lubricant application procedure employed when the solid lubricant is a wax type.

A wax-type lubricant may be applied as a liquid, either in a molten state or dissolved in a volatile solvent. Application in a molten state is preferred because that does not involve the provision of ventilation equipment which is required when volatile solvents are employed.

Whether molten or in solution, the wax-type material may be applied as a liquid by employing one of the following techniques: three roll, reverse roll coating in which an applicator roll rotates in a direction which is the reverse of the direction of the advancing strip, at the location where the roll engages the strip; two roll, forward roll coating in which the applicator roll rotates in the same direction as the advancing strip, at the location where the roll engages the strip; electrostatic spraying; air assisted spraying; and airless spraying. Roll coating may employ a gravure (patterned) pick-up roll surface or a smooth, patternless pick-up roll surface. (Liquid lubricant material is initially applied to a pick-up roll from which the liquid is transferred to an applicator roll.) The techniques described above are all conventional expedients. Roll coating is preferred over spraying. Among the spraying techniques, electrostatic spraying is preferred. Examples of some of these expedients and the advantages and disadvantages thereof are described in the aforementioned Coduti, et al. U.S. patent.

Roll coating provides the best control from the standpoint of uniformity of thickness of the solid lubricant film. Electrostatic spraying produces a uniform weight per unit area for the lubricant film, but a uniform film thickness is difficult to obtain. Instead, the lubricant will be present as hills or valleys. Where uniformity of thickness is not a concern, and uniformity of weight per unit area is sufficient to accommodate one's needs, electrostatic spraying may be employed.

The melting point of a wax-type lubricant is generally in the range 120°–150° F. (49°–66° C.). Molten wax breaks down or decomposes at an elevated temperature, above its melting point, e.g. above 200° F. (93° C.). When molten wax is applied to a steel strip, the steel strip must be at a temperature high enough to allow the molten wax to adhere thereto, and, of course, the steel strip should be at a temperature below the decomposition temperature of the wax, i.e. below about 200° F. (93° C.). In accordance with the present invention, it has been determined that the steel strip can be at a temperature as low as about 90° F. (32° C.) in order to obtain satisfactory adherence of the molten wax.

When the molten wax lubricant is applied by applicator roll, the minimum temperature to which the strip should be preheated, before the wax coating is applied, is a strip temperature at which poor wax coating laydown is avoided. Poor wax coating laydown gives a non-uniform lubricant coating and is characterized by a visible coating pattern comprising a series of closely spaced, parallel lines extending transversely to the direction of strip movement. This pattern, called "chatter", is often accompanied by a squealing noise from the applicator roll. Generally, poor wax coating laydown can be avoided by preheating the strip to a temperature above about 90°–95° F. (32°–35° C.). The strip preheat temperature for avoiding poor coating laydown on a given strip may vary with variations in solid lubricant composition and/or with the characteristics of the lubricant application equipment and procedure. If, at a given strip preheat temperature above 90° F., the lubricant coating still exhibits the above-described characteristics of poor wax coating laydown, the strip temperature can be increased by increments of 5° or 10° F. until the aforementioned undesired characteristics disappear.

In summary, the strip should be preheated to a temperature (a) above about 90° F. and (b) at which poor wax coating laydown is avoided. Such a preheating step, prior to applying molten wax lubricant by roll coating, will provide for both coating adherence and coating uniformity.

When the molten wax lubricant is applied by roll coating, the steel strip need not be heated above the melting point of the wax lubricant. The lower the strip preheat temperature, the easier it is to accommodate the strip preheating step (and any subsequent cooling step) to (a) the space limitations in the steel strip processing line and (b) the strip speed synchronizing requirements, imposed upon the lubricant application procedure when one attempts to combine that procedure in-line with a method for processing steel strip in an existing strip processing line.

When the molten wax lubricant is applied by spraying, it may be necessary to preheat the strip to a temperature above the melting point of the lubricant in order to assure that the entire surface of the strip is coated with lubricant. This is because, at a lower strip temperature, droplets of molten wax sprayed onto the strip surface may cool and solidify before they have a chance to spread and merge with other droplets. At a strip temperature above the melting point of the wax lubricant, the entire strip surface can be coated with lubricant; however, there can still be non-uniformity in the thickness of the solid lubricant coating (i.e. lubricant hills and valleys).

As noted above in connection with FIG. 2, the temperature of the moving steel strip is adjusted at 15 before the film-forming lubricant material is applied at 16. If the temperature of the steel strip is too low, i.e. below the temperature at which the molten wax will adhere to the steel strip or at which poor coating laydown disappears, then the temperature-adjusting step comprises heating the strip prior to material-applying step 16. If the temperature of the moving steel strip is too high, then, of course, temperature-adjusting step 15 comprises a cooling step.

Generally, absent a hot-dip coating step or a galvannealing step immediately upstream of lubricant application procedure 12, the moving steel strip will be relatively cool, so that temperature-adjusting step 15 comprises a heating step. In such a case, the performance of the heating step is constrained by employing a non-emission heating technique which preferably comprises either induction heating or infra-red radiant heating, both of which are conventional expedients. Both of these techniques will heat the steel strip relatively rapidly, thereby minimizing the space requirements for the equipment utilized in these heating techniques and allowing the speed of the strip moving through the lubricant application procedure to be synchronized with the speed of the strip as the strip moves through the steel strip processing method upstream and downstream of the lubricant application procedure. Induction heating may be performed in a conventional induction heating furnace. Infrared radiant heating employs electric filaments heated by resistance heating and composed of a material which creates lightwave emissions heavily concentrated in the infra-red part of the emission band.

Other heating expedients may be employed. One such expedient comprises straight conduction heating with hot rolls which engage the strip and heat it as the strip passes therebetween. Another expedient employs a blast of very turbulent, non-laminar air super-heated to a temperature in the range 600°–900° F. (316°–482° C.). As used herein, the term "non-emission heating technique" includes all of the heating expedients described above.

After the lubricant application procedure, the steel strip is coiled. When the lubricant is applied as a molten wax, the lubricant must be solidified to a hard finish before coiling. In such a case, the temperature-adjusting step at 17 (FIG. 2) comprises a cooling step. More particularly, immediately after material-applying step 16, the strip is chilled to a temperature substantially below the melting point of the wax to rapidly solidify the wax before the strip is coiled. In order to accommodate the space limitations in the steel strip processing line, and in order to synchronize the speed of the steel strip moving through the lubricant application procedure with the speed of the steel strip in the strip processing method, the performance of the cooling step is constrained by employing a refrigerated cooling medium comprising one of the following, for example: chilled air; chilled water; liquid nitrogen spray; and chilled rolls wherein a refrigerated cooling medium is circulated through cooling channels in a pair of rolls which engage the moving strip therebetween.

The criterion for employing a given cooling (or heating) technique is that it changes the temperature of the steel strip sufficiently rapidly to accommodate to the time limit imposed by (a) the space limitations of the steel strip processing line and (b) the synchronization of the strip speed in lubricant application procedure 12 with the strip speed in processing method 11, 13.

When the solid lubricant comprises a polymer rather than a wax-type lubricant, the lubricant is applied as a liquid in the form of an aqueous solution utilizing material-applying steps employing the same techniques (e.g. rolling, spraying) described above in connection with applying a wax-type lubricant.

When a polymer-type of solid lubricant is employed, the thermal pre-treatment 15 employed before the lubricant is applied as a liquid at 16 is not so crucial as when the lubricant is applied in the form of a wax. Nevertheless, depending upon the processing 11 to which the steel strip has been subjected upstream of solid lubricant application procedure 12, a thermal pre-treatment 15, as part of procedure 12, may be desired, or required.

More particularly, when the lubricant is applied in the form of an aqueous solution, the steel strip should be at a temperature below the vaporization or decomposition temperature of the lubricant (as distinguished from the vaporization temperature of the carrier liquid in which the lubricant is dissolved). Generally, unless the strip has been subjected to a substantial temperature-raising procedure immediately upstream of lubricant application procedure 12, the steel strip will normally be at a temperature below that at which the lubricant vaporizes. If not, then the strip should be subjected to a thermal pre-treatment 15 in which the temperature of the strip is adjusted by chilling the strip to the desired temperature, employing a refrigerated cooling medium, as discussed above in connection with the cooling step employed at 17 following the application of a molten wax-type lubricant.

Preferably, when the lubricant is applied in the form of an aqueous solution, the strip should be at a temperature greater than 32° F. (0° C.) and up to a temperature in the range of about 60°–70° F. (16°–21° C.). If the steel strip has a temperature below 32° F., then it should be subjected to a thermal pre-treatment 15 as part of lubricant application procedure 12. Such a treatment comprises adjusting the temperature of the steel strip by heating, employing the heating techniques described above in connection with heating the steel strip immediately before the lubricant is applied in the form of a molten wax.

After the lubricant is applied in the form of an aqueous solution, the strip is subjected to a thermal-post treatment 17 which comprises adjusting the temperature of the strip by heating the strip to a temperature substantially above the boiling point of water (212° F. or 100° C.) but below the decomposition temperature of the lubricant, to drive off the water from the aqueous solution before the strip is subjected to a subsequent coiling step. Typically the strip should be heated at 17 to a temperature in the range 300°–400° F. (149°–204° C.).

As noted above, when the lubricant is applied in the form of an aqueous solution, the lubricant is typically a polymer, e.g. an acrylic polymer. Accordingly, the heating step employed in the thermal-post treatment 17 should not only dry the lubricant but also supply sufficient heat to the lubricant to cure (cross link) the polymer before the strip is coiled, without degrading the polymer. The temperature range described in the preceding paragraph would generally suffice.

In case the lubricant is unintentionally overheated at 17, degradation can be avoided by rapidly quenching, immediately downstream of 17, with a curtain of cold water. The drying step can be facilitated by preheating the strip at 15 prior to the application of the lubricant in the form of an aqueous solution. Although, in such a case, the preliminary heating step at 15 heats the strip to a relatively low temperature (e.g merely up to 60°–70° F. or 16°–21° C.), step 15 does provide the strip with some sensible heat at least a part of which is retained during the lubricant material-applying step at 16. In doing so, step 15 reduces the amount of heat which must be supplied during the drying step at 17 in order to vaporize the water in which the lubricant is dissolved. Because the amount of heat required to vaporize a given amount of water is relatively high compared to other, more volatile solvents, it can be desirable to impart heat to the strip at 15 for carryover to station 17.

The strip can, of course, arrive at lubricant application procedure 12 at an elevated temperature above that described three sentences above; this can be permitted so long as the strip temperature is below the decomposition (vaporization) temperature of the lubricant in the aqueous solution. If the strip is at a desired elevated temperature at the time it arrives at temperature-adjusting station 15, pre-heating need not be employed at 15. Generally, pre-heating must be employed only in those case where it is necessary to raise the temperature of the strip above 32° F. (0° C.); such a situation would arise essentially only when the strip has been stored in a relatively cold environment immediately prior to performance of the steel processing method with which the lubricant application procedure has been combined. This will be discussed more fully below in connection with a steel strip inspection method.

Further with respect to the performance of a post-heating step at 17, that heating step must accommodate (a) the space limitations of the steel strip processing line an 13 and (b) synchronization of the speed of the moving strip, during lubricant application procedure 12, with the speed of the steel strip during the steel strip processing method 11, 13. Accordingly, the heating step at 17 is constrained by employing a non-emission heating technique; this was described above in connection with the pre-heating of the steel strip when the lubricant is applied in the form of a molten wax (i.e. induction heating, infra-red radiant heating, etc.).

As noted above in connection with FIG. 1, lubricant application procedure 12 is part of a combination including upstream processing step 11 and downstream processing step 13. In such a combination, upstream processing step 11 may comprise temper rolling, and downstream processing step 13 may comprise coiling. In another such combination, upstream processing step 11 can comprise unwinding steel strip 10 from a coil, while downstream processing step 13 comprises: (1) simultaneously (a) inspecting for defects on the surface of the steel strip, through the transparent film of solid lubricant, and (b) inspecting the lubricant film, and then (2) coiling the inspected strip.

In either of the combinations described in the preceding paragraph, the lubricant may be applied in the form of a molten wax which is solid at room temperature or in the form of an aqueous solution. When the lubricant is applied in the form of a molten wax, the steel strip will probably require a heating step at 15, before the lubricant is applied at 16, and a chilling step at 17 after the lubricant is applied. Both of these steps have been described above.

When the lubricant is applied in the form of an aqueous solution a heating step will be required at 17 after the lubricant has been applied at 16, to boil off the water in which the lubricant is dissolved, etc.; all of this has been described above. It may also be necessary to perform a heating step at 15 before the lubricant in aqueous solution is applied at 16; this would occur in those instances where (a) the steel strip processing method employs either a temper rolling step or a strip inspection step at 11 and (b) the step performed at 11 is performed on a coil of steel strip which has been stored in a relatively cold environment. In such a case it may be necessary to heat the strip in order to raise the temperature thereof above 32° F. (0° C.).

In addition to those combinations described above, there are other embodiments of combinations in accordance with the present invention. In one such embodiment, the processing step performed at 11 upstream of solid lubricant application procedure 12 comprises applying a metal coating on the strip, and the processing step performed at 13 downstream of lubricant application procedure 12 comprises coiling the strip. In this embodiment, the metal coating may comprise zinc, aluminum or alloys thereof applied by dipping the steel strip in a hot bath of molten metal. This embodiment will hereinafter be discussed principally in the context of zinc; however, such discussions are usually also applicable to aluminum and to alloys of zinc or aluminum, unless otherwise indicated or apparent. In each such case, the lubricant is applied after the molten metal has solidified and the strip has cooled. The lubricant may be applied in the form of a molten wax which is solid at room temperature or in the form of an aqueous solution.

When the lubricant is applied in the form of a molten wax, there is no heating step at 15, between the hot-dipping step at 11 and the application of the liquid lubricant at 16. This is because, at the time the lubricant is applied in-line at 16, the strip temperature is usually still hot enough from the hot-dipping step at 11 to eliminate the need for a heating step at 15. Generally, a strip, which has been coated with metal by a hot-dipping procedure, is subjected to a cooling procedure as part of the metal-coating operation. It is contemplated that the temperature of the metal-coated steel strip at the end of this conventional cooling procedure can be controlled, during that procedure, to provide the strip temperature desired at the time the lubricant is applied at 16 as a molten wax. Then, after the molten wax has been applied at 16, the temperature of the strip is adjusted by chilling the strip at 17 to a temperature substantially below the melting point of the wax, to rapidly solidify the wax before the strip is coiled at 13.

In some conventional strip processing methods in which the strip is hot-dip coated with zinc, the strip is subjected to a galvannealing step, a conventional procedure in which, after coating, the strip is heated to a temperature at which (a) the zinc in the coating and (b) the iron in the steel strip alloy with each other. Such a processing method can be employed in combination with a lubricant application procedure 12 in accordance with the present invention. In such a combination, the lubricant is applied after the galvannealing step. When the lubricant is applied in the form of a molten wax which is solid at ambient temperature, there is usually no heating step between the galvannealing step, performed at 11, and the application of the lubricant at 16. This is because sufficient heat is usually retained in the strip from the galvannealing step to eliminate the need for a separate heating step at 15 prior to the application of the lubricant at 16.

The temperature of the galvannealed strip at the time the molten wax is applied will probably be below the temperature at which the wax degrades. If not, a chilling step will have to be performed at 15 prior to the application of the wax lubricant at 16. After the molten wax has been applied at 16, the temperature of the strip is adjusted by chilling the strip at 17, immediately after the lubricant material-applying step. This cools the strip to a temperature substantially below the melting point of the wax and rapidly solidifies the wax before the strip is coiled, all of this having been described above.

As noted above, when the strip is hot-dip coated with zinc or other molten metal at 11, and lubricant is applied thereafter at 12, the lubricant may be applied in the form of an aqueous solution. In such a case, there is no heating step between the hot-dipping step performed at 11 and the application of the lubricant at 16. This is because the metal-coated strip approaching station 16 is already at an elevated temperature which may even be above the decomposition temperature of the lubricant. In the latter case, the temperature of the strip is adjusted at 15 by chilling the strip, before the lubricant is applied at 16, to a temperature below the decomposition temperature of the lubricant but, of course, above at least the freezing point of water.

Cooling at 15 can be controlled to conserve the heat carried over from the hot-dipping step and maintain a strip temperature above the vaporization temperature of water at the time the lubricant is applied to the strip at 16. Applying the lubricant as an aqueous solution will further cool the steel strip. After the lubricant has been thus applied, the strip is heated at 17 to provide a strip temperature substantially above the boiling point of water, but below the decomposition temperature of the lubricant, to drive off the water from the aqueous solution before the strip is coiled. In addition, because the lubricant is a polymer, the heating step should supply sufficient heat to cure the polymer before the strip is coiled.

As noted above, when the zinc-coated strip is subjected to a galvannealing step at 11, the lubricant is applied after the galvannealing step. This lubricant may be applied in the form of an aqueous solution, in which case there is no heating step between the galvannealing step at 11 and the application of the lubricant at 16, for the same reasons that there is no heating step prior to the application of the lubricant when the strip has been subjected to a hot-dip coating step. Similarly, the strip temperature may be adjusted at 15, before the lubricant is applied at 16, by chilling the metal-coated, galvannealed strip to a temperature below the decomposition temperature of the lubricant but above at least the freezing point of water and preferably above the boiling point of water. In addition, the strip is heated at 17 after the lubricant is applied at 16, to a temperature substantially above the boiling point of water, but below the decomposition temperature of the lubricant, to drive off the water from the aqueous solution before the strip is coiled. Moreover, because the lubricant is a polymer, the heating step should supply sufficient heat to cure the polymer before the strip is coiled.

The above-described heating and cooling steps, which are used when a galvannealing step is employed in combination with a solid lubricant application procedure, are applicable whether the galvannealing step is performed on a strip coated with zinc by a hot-dipping procedure or by an electrolytic procedure. With either metal-coating procedure, the lubricant applied after the galvannealing step may be in the form of a molten wax or in the form of an aqueous solution.

In all of the combinations described above, the continuous steel strip is unwound from a coil at the beginning of the steel strip processing method, and it is rewound into a coil at the end of the steel strip processing method. As noted above, the strip speed during processing step 13 downstream of lubricant application procedure 12 is synchronized with the strip speed of processing step 11 performed upstream of the lubricant application procedure. In addition, the strip speed during solid lubricant application procedure 12 is synchronized with the strip speeds upstream and downstream of that procedure. When the steel strip processing method is performed on an inspection line or on a line where the strip is coated with a metal such as zinc, the strip speed is in the range 200–1000 ft./min (61–305 m/min.), for example. On a temper rolling line, the strip speed can be in the range 2,500–5,000 ft./min. (762–1,524 m/min.), for example. The strip speeds described above are exemplary of the strip speeds normally attained in (a) the steel strip processing method in the absence of (b) an in-line lubricant application procedure; the combination of (a) and (b) in accordance with the present invention does not substantially diminish those strip speeds.

When the strip speed is in the range 2,500–5,000 ft./min (762–1,524 m/min.), a solid lubricant is preferably applied using a procedure called curtain coating. A curtain coating procedure is a conventional technique which employs a descending curtain of liquid lubricant (either molten wax or an aqueous solution), very much like a waterfall, and in which the flow rate of the descending curtain is very closely controlled.

Solid lubricants such as waxes which are not soluble in water cannot be applied in the form of an aqueous solution. Such lubricants, however, are soluble in more volatile organic solvents such as chlorinated or fluorinated hydrocarbons or alcohols or ketones. In such a case, the drying temperature, to which the solution is subjected to dry off the liquid carrier (i.e. the volatile organic solvent), would be less than the temperature employed to boil off water when the solution is aqueous. The drying temperature would, of course, depend upon the vaporization temperature of the liquid, organic solvent. This information can be obtained from standard handbooks. A drawback to the employment of volatile organic solvents is the need to employ suitable ventilation and collection equipment to exhaust the volatile fumes.

When a wax lubricant is applied in the form of a solution, it is not necessary to preheat the strip at 15; this is because the volatile solvent can be driven off with much less heat than that required to drive off water from an aqueous solution of lubricant (as when a polymer-type lubricant is applied). A heating step is performed at 17 to drive off the volatile solvent. This heating step is controlled so that the resulting temperature of the solution and of the steel strip is below the decomposition temperature of the wax lubricant but above the melting point of the wax lubricant to assure distribution of the wax lubricant coating over the entire surface of the steel strip.

Unless otherwise indicated, whenever reference is made herein to "wax" or "wax type" with respect to solid lubricants, it is intended to include: wax lubricants per se; lubricant compositions in which a principal ingredient is a wax lubricant; lubricant compositions having thermal characteristics which enable them to be applied and solidified in a manner similar to molten wax; and lubricant compositions having solute characteristics which enable them to be dissolved and applied to a steel strip in a manner similar to wax lubricant solutions.

Similarly, unless otherwise indicated, whenever reference is made herein to "polymer" or "polymer-type" with respect to solid lubricants, it is intended to include: acrylic polymer lubricants; lubricant compositions in which a principal ingredient is an acrylic polymer; and lubricant compositions containing other polymers having solute and thermal characteristics which enable them to be applied, dried and cured in a manner similar to acrylic polymers.

The foregoing detailed description has been given for clearness of understanding only, and no unnecessary limitations should be understood therefrom, as modifications will be obvious to those skilled in the art.

We claim:

1. The combination of (a) a multi-step method for processing a continuous steel strip in a line and (b) a solid lubricant application procedure incorporated in-line with said strip processing method between steps thereof, for applying, to said steel strip, as alternatives, either a wax or polymer material, each of which forms a transparent film of solid lubricant on the steel strip, wherein said strip-processing method comprises the steps of:

performing at least one processing step at an upstream location;

performing at least one processing step downstream of the location of said upstream processing step;

said strip having a strip speed in the upstream processing step and a strip speed in the downstream processing step;

moving said steel strip in a downstream direction during said processing steps;

and synchronizing the speed of the moving steel strip in said downstream processing step with the strip speed employed in said upstream processing step;

said strip having a strip temperature as it undergoes processing;

said combination comprising performing said lubricant application procedure in-line with said strip-processing method, between said upstream and downstream processing steps;

said lubricant application procedure comprising the steps of:

providing said line with both (a) a capability for applying a film-forming wax material, as a liquid, and (b) a capability for applying a film-forming polymer material, as a liquid;

applying one of said film forming materials, as a liquid, to said moving steel strip while the other material remains unapplied;

said material-applying step being capable of applying, as alternatives, either said wax material or said polymer material;

providing said line with a capability for adjusting the temperature of said moving steel strip upstream of said material-applying step;

said upstream temperature-adjusting capability constituting (i) a non-emission heating technique or (ii) a chilling technique employing a refrigerated cooling medium, or the capability of employing techniques (i) and (ii) alternatively;

providing said line with a capability for adjusting the temperature of said strip downstream of said material-applying step, using a non-emission heating technique;

providing said line with a capability for adjusting the temperature of said strip downstream of said material-applying step, using a chilling technique employing a refrigerated cooling medium;

sensing the temperature of said moving steel strip upstream of said material-applying step;

employing said upstream temperature-adjusting capability selectively (1) in response to the particular film-forming material that is applied or (2) in response to said upstream temperature sensing step or (3) in response to a combination of (1) and (2) to subject said strip to (a) heating or (b) cooling or (c) neither (a) nor sensing the temperature of said moving steel strip downstream of said material-applying step;

adjusting the temperature of said moving steel strip downstream of said material-applying step either (a) by using said non-emission heating technique while said chilling technique remains unemployed or (b) by using said chilling technique while said non-emission heating technique remains unemployed;

synchronizing the speed of said moving steel strip during said lubricant application procedure with the strip speed employed in said strip-processing steps without substantially diminishing the speed normally attained in said strip-processing steps in the absence of performance of said lubricant application procedure, said normally-attained speed being at least 200 ft./min. (61 m/min.);

taking time to perform said material-applying and temperature-adjusting steps;

limiting the time available for performing said material-applying and temperature-adjusting steps, as a result of said speed-synchronizing step;

and constraining the performance of said material-applying and temperature-adjusting steps to accommodate to the time limitations imposed by said speed-synchronizing step;

the performance of said temperature-adjusting steps being constrained by the employment of one or more of said non-emission heating technique and said chilling technique.

2. The combination of claim 1 wherein:

said non-emission heating technique is one of the following: induction heating; infra-red radiation heating; conduction heating with heated rollers; and convection heating with non-laminar, turbulent air at a temperature in the range 600°–900° F. (316°–482° C.).

3. The combination of claim 1 or claim 2 wherein:

said refrigerated cooling medium is one of the following: chilled air; chilled water; liquid nitrogen spray; chilled rolls.

4. The combination of claim 1 wherein:

said temperature-adjusting steps employ said non-emission heating technique prior to said material-applying step and said chilling technique after said material-applying step.

5. The combination of claims 1 or 4 wherein:

said lubricant is applied in the form of a molten wax which is solid at ambient temperature;

said material applying step comprises roll coating;

and said upstream temperature-adjusting step comprises heating said strip, before said material-applying step, to a strip temperature above about 90° F. (32° C.) and at which poor coating laydown is avoided, but no greater than the melting point of said wax.

6. The combination of claims 1 or 4 wherein:

said lubricant is applied in the form of a molten wax which is solid at ambient temperature;

said material applying step comprises spraying;

and said upstream temperature-adjusting step comprises heating said strip, before said material-applying step, to a strip temperature above the melting point of said wax.

7. The combination of claim 4 wherein:

said non-emission heating technique is one of the following: induction heating; infra-red radiant heating.

8. The combination of claim 4 or 7 wherein:

said refrigerated cooling medium is one of the following: chilled air; chilled water; liquid nitrogen spray; chilled rolls.

9. The combination of claim 1 wherein:

said material-applying step is constrained by employing one of the following techniques: three roll reverse roll coating; two roll forward roll coating; electrostatic spraying; air assisted spraying; airless spraying; and curtain coating.

10. The combination of claim 1 wherein:

said upstream processing step comprises temper rolling;

and said downstream processing step comprises coiling.

11. The combination of claim 1 wherein:

said upstream processing step comprises unwinding said steel strip from a coil;

and said downstream processing step comprises simultaneously (a) inspecting for defects on the surface of said steel strip, through said transparent film of solid lubricant, and (b) inspecting said film, and then coiling the inspected strip.

12. The combination of claim 10 or 11 wherein:

said lubricant is applied in the form of a molten wax which is solid at ambient temperature;

and said upstream temperature-adjusting step comprises heating said strip, before said applying step, to a strip temperature, above about 90° F. (32° C.), at which said molten wax will adhere to the surface of said strip but below the decomposition temperature of said wax.

13. The combination of claim 12 wherein:

said lubricant is applied in the form of a molten wax which is solid at ambient temperature;

said material applying step comprises roll coating;

and said upstream temperature-adjusting step comprises heating said strip, before said material-applying step, to a strip temperature above about 90° F. (32° C.) and at which poor coating laydown is avoided, but no greater than the melting point of said wax.

14. The combination of claim 12 wherein:

said lubricant is applied in the form of a molten wax which is solid at ambient temperature;

said material applying step comprises spraying;

and said upstream temperature-adjusting step comprises heating said strip, before said material-applying step, to a strip temperature above the melting point of said wax.

15. The combination of claim 12 wherein said downstream temperature-adjusting step comprises:

chilling said strip, immediately after said applying step, to a temperature substantially below the melting point of said wax, to rapidly solidify said wax before said strip is subjected to said coiling step.

16. The combination of claim 10 or 11 wherein:

said lubricant is applied in the form of an aqueous solution;

and said downstream temperature-adjusting step comprises heating said strip, after said applying step, to a temperature substantially above the boiling point of water but below the decomposition temperature of said lubricant, to drive off the water from said aqueous solution before the strip is subjected to said coiling step.

17. The combination of claim 16 wherein:

said lubricant is a polymer;

and said heating after the applying step comprises supplying sufficient heat to cure said polymer before the strip is subjected to said coiling step.

18. The combination of claim 16 and comprising:

providing said strip with a temperature above the freezing point of water but below the decomposition temperature of said lubricant, at the beginning of said applying step.

19. The combination of claim 18 wherein:

said strip is heated in said upstream temperature adjusting step so as to have attained a temperature in the range 32°–70° F. (0°–21° C.) at the beginning of said applying step.

20. The combination of claim 1 wherein:

said upstream processing step comprises applying a metal coating on said strip;

and said downstream processing step comprises coiling.

21. The combination of claim 20 wherein:

said metal coating is applied by dipping said strip in a bath of molten coating metal.

22. The combination of claim 21 wherein:

said lubricant is applied after said coating metal has solidified and said strip has cooled.

23. The combination of claim 22 wherein:

said lubricant is applied in the form of a molten wax which is solid at ambient temperature;

said downstream temperature-adjusting step comprises chilling said strip, immediately after said applying step, to a temperature substantially below the melting point of said wax, to rapidly solidify said wax before said strip is subjected to said coiling step;

and there is no heating step between said dipping step and the application of said lubricant.

24. The combination of claim 22 wherein:

said metal coating comprises zinc;

said metal-coated strip is subjected to a galvannealing step;

said lubricant is applied after said galvannealing step;

said lubricant is applied in the form of a molten wax which is solid at ambient temperature;

said downstream temperature-adjusting step comprises chilling said strip immediately after said applying step to a temperature substantially below the melting point of said wax, to rapidly solidify said wax before the strip is subjected to said coiling step;

and there is no heating step between said galvannealing step and the application of said lubricant.

25. The combination of claim 22 wherein:

said lubricant is applied in the form of an aqueous solution;

said upstream temperature-adjusting step comprises cooling said metal-coated strip, before applying said lubricant, to a temperature below the decomposition temperature of said lubricant but above the freezing point of water;

and there is no heating step between said dipping step and the application of said lubricant.

26. The combination of claim 25 wherein said downstream temperature-adjusting step comprises:

heating said strip after said applying step, to a temperature substantially above the boiling point of water but below the decomposition temperature of said lubricant, to drive off the water from said aqueous solution before the strip is subjected to said coiling step.

27. The combination of claim 26 wherein:

said lubricant is a polymer;

and said heating after the applying step comprises supplying sufficient heat to cure said polymer before the strip is subjected to said coiling step.

28. The combination of claim 21 wherein:

said metal coating comprises zinc;

said metal-coated strip is subjected to a galvannealing step;

said lubricant is applied after said galvannealing step;

said lubricant is applied in the form of an aqueous solution;

said upstream temperature-adjusting step comprises cooling said metal-coated strip, before applying said lubricant, to a temperature below the decomposition temperature of said lubricant but above the freezing point of water;

there is no heating step between said galvannealing step and the application of said lubricant;

and said downstream temperature-adjusting step comprises heating said strip, after said applying step, to a temperature substantially above the boiling point of water but below the decomposition temperature of said lubricant, to drive off the water from said aqueous solution before the strip is subjected to said coiling step.

29. The combination of claim 28 wherein:

said lubricant is a polymer;

and said heating after the applying step comprises supplying sufficient heat to cure said polymer before the strip is subjected to said coiling step.

30. The combination of claim 20 wherein:

said metal coating on the strip is applied electrolytically.

31. The combination of claim 30 wherein:

said metal coating comprises zinc;

said metal-coated strip is subjected to a galvannealing step; and said lubricant is applied after said galvannealing step.

32. The combination of claim 31 wherein:

said lubricant is applied in the form of a molten wax which is solid at ambient temperature;

said downstream temperature-adjusting step comprises chilling said strip, immediately after said applying step, to a temperature substantially below the melting point of said wax, to rapidly solidify said wax before said coiling step;

and there is no heating step between said galvannealing step and the application of said lubricant.

33. The combination of claim 31 wherein:

said lubricant is applied in the form of an aqueous solution;

said upstream temperature-adjusting step comprises cooling said metal-coated strip, before applying said lubricant, to a temperature below the decomposition temperature of said lubricant but above the freezing point of water;

there is no heating step between said galvannealing step and the application of said lubricant;

and said downstream temperature-adjusting step comprises heating said strip, after said applying step, to a temperature substantially above the boiling point of water but below the decomposition temperature of said lubricant, to drive off the water from said aqueous solution before said coiling step.

34. The combination of claim 29 wherein:

said lubricant is a polymer;

and said heating after said applying step comprises supplying sufficient heat to cure said polymer before the strip is subjected to said coiling step.

35. The combination of claim 1 wherein:

said continuous steel strip is unwound from a coil at the beginning of said processing method and rewound into a coil at the end of said processing method.

36. A method as recited in claim 1 wherein:

said upstream strip-processing step comprises applying a metal coating on said strip;

and said normally attained processing speed is in the range 200–1,000 ft./min. (61–305 m/min.).

37. A method as recited in claim 1 wherein:

said upstream strip-processing step comprises a temper rolling step;

and said normally attained processing speed is in the range 2,500–5,000 ft./min. (762–1,524 m/min.).

38. The combination of claim 1 wherein:

the space for performing said lubricant application procedure in-line with said strip processing method is limited by the space available between the locations of said upstream and downstream processing steps before said combination;

the time available for performing said material-applying and temperature-adjusting steps is limited as a result of said space-limitation;

and the performance of said material applying and temperature-adjusting steps is contained to accommodate to the time limitations imposed by said space-limitation.

39. The combination of claim 38 wherein:

said upstream processing step comprises temper rolling;

and said downstream processing step comprises coiling.

40. The combination of claim 38 wherein:

said upstream processing step comprises unwinding said steel strip form a coil;

and said downstream processing step comprises simultaneously (a) inspecting for defects on the surface of said steel strip, through said transparent film of solid lubricant, and (b) inspecting said film, and then coiling the inspected strip.

41. A method as recited in claim 1 wherein:

said downstream processing step comprises inspecting the strip for defects;

and said normally attained processing speed is in the range 200–1,000 ft./min. (61–305 m/min.).

* * * * *

UNITED STATES PATENT AND TRADEMARK OFFICE
CERTIFICATE OF CORRECTION

PATENT NO. : 5,616,367
DATED : April 1, 1997
INVENTOR(S) : Elliott Y. Spearin and James S. Carney It is certified that error appears in the above-indentified patent and that said Letters Patent is hereby corrected as shown below:

Col. 12, line 50,   "dollstream" should be --downstream--.

Col. 12, line 64,   after "nor" add --(b)--.

Col. 18, line 2,    "contained" should be --constrained--.

Signed and Sealed this

Twenty-sixth Day of August, 1997

Attest:

BRUCE LEHMAN

Attesting Officer

Commissioner of Patents and Trademarks